Sept. 6, 1966  G. F. QUITTNER  3,271,662
FLAW DETECTING APPARATUS HAVING MULTIPLE PICK-UP AND EXCITING
COILS ON THE SAME SIDE OF THE TEST PIECE
Filed Aug. 22, 1962  3 Sheets-Sheet 1

INVENTOR.
GEORGE F. QUITTNER
BY
Richard MacCutcheon
ATTORNEY

INVENTOR.
GEORGE F. QUITTNER
BY
ATTORNEY

INVENTOR.
GEORGE F. QUITTNER
BY
*Richard MacCutcheon*
ATTORNEY

United States Patent Office 3,271,662
Patented Sept. 6, 1966

3,271,662
FLAW DETECTING APPARATUS HAVING MULTIPLE PICK-UP AND EXCITING COILS ON THE SAME SIDE OF THE TEST PIECE
George F. Quittner, Cleveland Heights, Ohio, assignor, by mesne assignments, to API Instruments Company, Chesterland, Ohio, a corporation of Ohio
Filed Aug. 22, 1962, Ser. No. 218,783
2 Claims. (Cl. 324—37)

The present invention relates to magnetic and/or eddy current flaw detection devices and has particular significance in connection with equipment for non-destructively testing and/or positioning sample material in the form of metallic sheet or tube (a tube merely amounting to a wound up sheet). In one aspect the present invention discloses and claims improvements over the arrangements disclosed and claimed in my co-pending patent application Serial No. 94,472, filed March 9, 1961, and copending patent application Serial No. 159,479, filed Dec. 15, 1961, now Patent 3,156,862, in the name of Norman A. Herrick.

As described in the above mentioned patent applications, two or more exciting coils are located on one side of sheet material to be inspected, and on the opposite side of the sheet are sensing coils, all of the coils being located with their axes essentially perpendicular to the broad faces of the sample. In some situations, however, such an arrangement has led to the following difficulties: (1) an impractically large amount of excitation power may be required to produce adequate fields on the opposite side of the sample sheet; (2) often the through-the-sheet inspection technique is not most economical, as is the case when inspecting certain grades of sheet which are supplied by steel makers free of defects on one side; (3) in the inspection of pipe it is often not practical to place one half of the "excitation-sensing" arrangement inside and the other half outside the pipe and still maintain between the parts a fixed geometric relation particularly when there is relative movement of sample with regard to the flaw-finding apparatus; (4) in many existing processing lines it is difficult to install a two sides of sample excitation sensing arrangement, due simply to space limitations; (5) with excitation on opposite side of sample from sensing sensitivity is not predictably related to distance from coils to sample though it is often advantageous to have it so, for example when it is desired that inspection sensitivity vary according to some predetermined plan such as across the width of sample sheet.

It is an object of the present invention to provide simple means for overcoming the above mentioned difficulties.

Another object is to provide arrangements permitting excitation and pickup on the same side of a sheet or tube material.

Another object of the invention is to provide means for accurately positioning tubing having a longitudinal weld or seam.

Another object is to provide one side of sheet schemes with relative insensitivity to tilt of sheet with respect to pickup and excitation means.

Another object of the invention is to provide improvements which are applicable to either "through the sheet" or one side of the sheet arrangements.

Other objects and advantages will become apparent and the invention may be better understood from consideration of the following description taken in connection with the accompanying drawings, in which.

Figure 1:
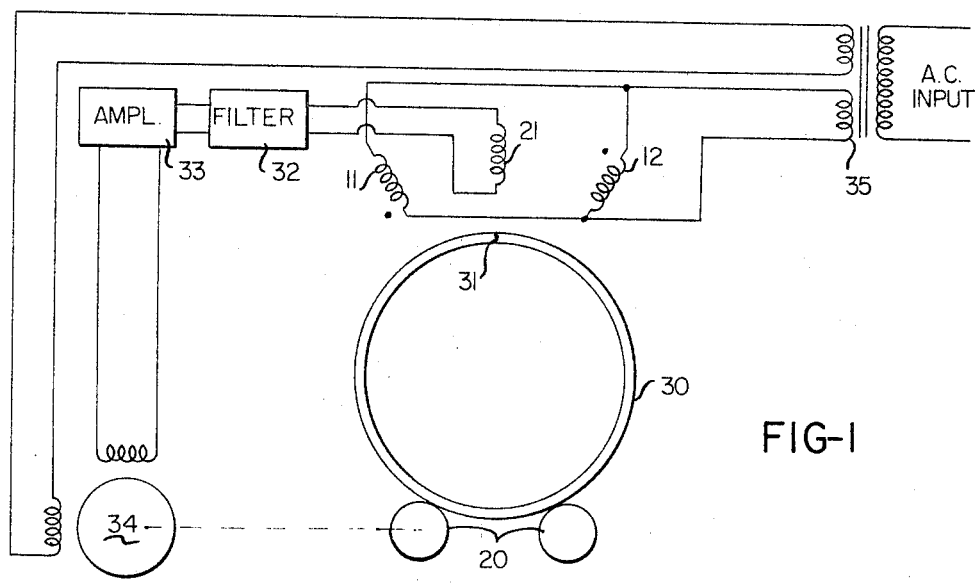
FIG. 1 is a diagrammatic representation of a positioner for a seam welded pipe sample.

Referring now to the drawings, FIG. 1 shows a one side of sheet (the sheet being closed on itself as a tubing) arrangement where exciter coils 11 and 12 are oppositely phased (by direction of winding with respect to connections) as indicated by the dot convention. A null plane is established between them, as explained in the Herrick application, and a single pickup coil 21 has its axis located substantially in the null plane between the exciter coils. A pipe sample 30 is a sheet closed upon itself by a weld 31. For processing purposes it is often desirable that the pipe be automatically positioned so that the weld is located always at one position, for example accurately on top. When the weld is located precisely beneath coil 21, the output voltage of coil 21 will be null, or at least consist primarily of harmonics and other noise. By passing this voltage through a filter 32, nearly all of any residual voltage can be eliminated, the filter being tuned to pass only excitation frequency. When the pipe is accurately positioned, therefore, the output of a filter fed amplifier 33 will be essentially zero. However a slight position inaccuracy can produce amplifier output of considerable amplitude and of a phase either due to coil 11 or due to coil 12 (depending on error direction). By using a conventional two-phase servo motor 34, with one phase supplied directly by a transformer 35 which also supplies alternating current to the exciter coils 11 and 12, the motor operates in correct direction to return the weld equilibrium (null) position. Conventional means (not shown) may be used to delay or advance one of the phases to the servo motor by approximately 90° in order to obtain the usual two phase self-starting condition.

Figure 2:
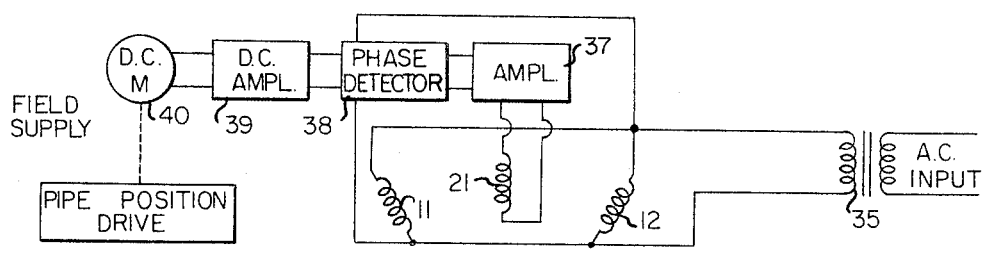
FIG. 2 is a schematic representation of another arrangement for positioning such a pipe sample.

A modification is shown in the schematic diagram of FIG. 2. Here coils 11, 12 and 21 are positioned as before about the pipe (not shown), sensing coil 21 directly feeds an amplifier 37 whose output is fed into a phase detector 38 which may be of conventional type.

Figure 3:
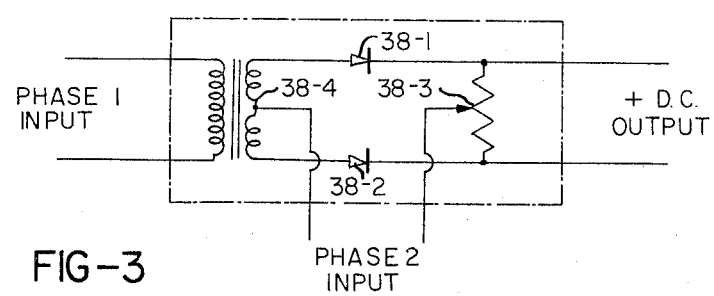
FIG. 3 is a detail showing a conventional bridge circuit which may be used to perform the function of the phase detector 38 of FIG. 2.

In FIG. 3 is shown one of many suitable and known types of phase detectors useful in block 38 of FIG. 2. In the particular arrangement in FIG. 3 the voltage entering as phase 2 is applied to two rectifiers 38–1 and 38–2 simultaneously, so that during half of the period of phase 2 the two rectifiers cannot conduct at all because they are heavily back-biased. During the other half, of phase 2 period, they conduct heavily, being forward energized by phase 2. However, during forward conduction by phase 2, essentially no output voltage is generated as a result of correctly selecting the tap position of an output potentiometer 38–3. Meanwhile, phase 1 appears as two 180° out-of-phase voltages with respect to a transformer center tap 38–4. If, during any part of the conduction time due to phase 2 either the upper or lower rectifier conducts additional current because of the contribution of phase 1, this current will not be balanced out by the output voltage divider, and therefore will appear as D.C. pulses at the output whose direction and amplitude depend on the phase relations between phase 1 and phase 2. The pulses may be integrated (smoothed) if desired.

Returning to consideration of FIG. 2, the phase detector output is amplified at 39 and used to run a D.C. motor 40. Other means could be used instead and any type of bi-directional motor could be controlled by a polarized relay arrangement responsive to variable D.C. output of a phase detector. In such case it should be understood that even a relay arrangement serves as "amplifying means."

Figure 4:
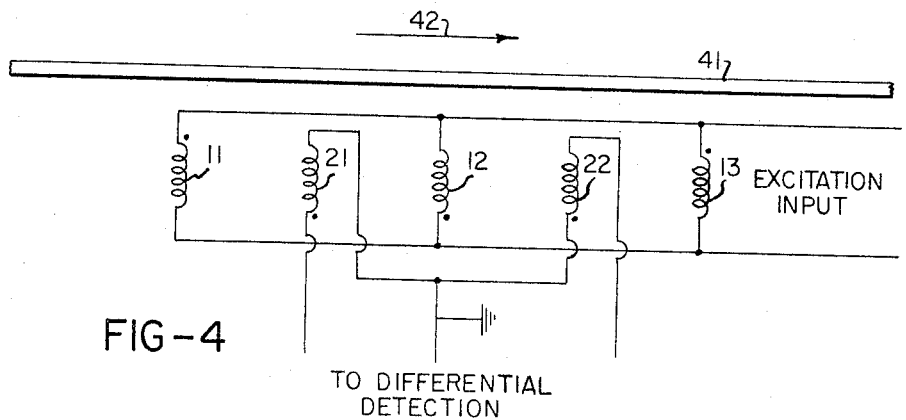
FIG. 4 shows another arrangement which, like FIG. 1, is a one side of sample improvement on the Herrick arrangement of placing sensing coil means in a nul plane or planes between excitation coils.

FIG. 4 shows an arrangement for finding flaws (scabs, holes, welds, etc.) in a flat sheet 41 assumed traveling in the direction of arrow 42. Exciter coils 11, 12, and 13 are oppositely phase as regards their successive adjacency (note dots). Sensing coils 21 and 22 are located in the null planes thus established and like phased and fed to differential detecting means, not shown but examples of which are completely illustrated and described in my co-pending application, Serial No. 187,875, filed April 16, 1962, now abandoned and continued in application Serial No. 502,766, filed October 18, 1965. Now two theories are combined. For "outside" generated noise the difference detection arrangement provides much better nulls than could null plane location of sensing coil means alone provide, and with an arrangement as in FIG. 4 a particularly effective sensitivity can be achieved even with surprisingly large sample to coil distances. Note that even if the pickup is balanced with small sample to coil spacing, increasing the spacing does not destroy the null. The arrangement also offers, compared to other one-side-of-sheet schemes, relative insensitivity to sheet tilt.

Figure 5:
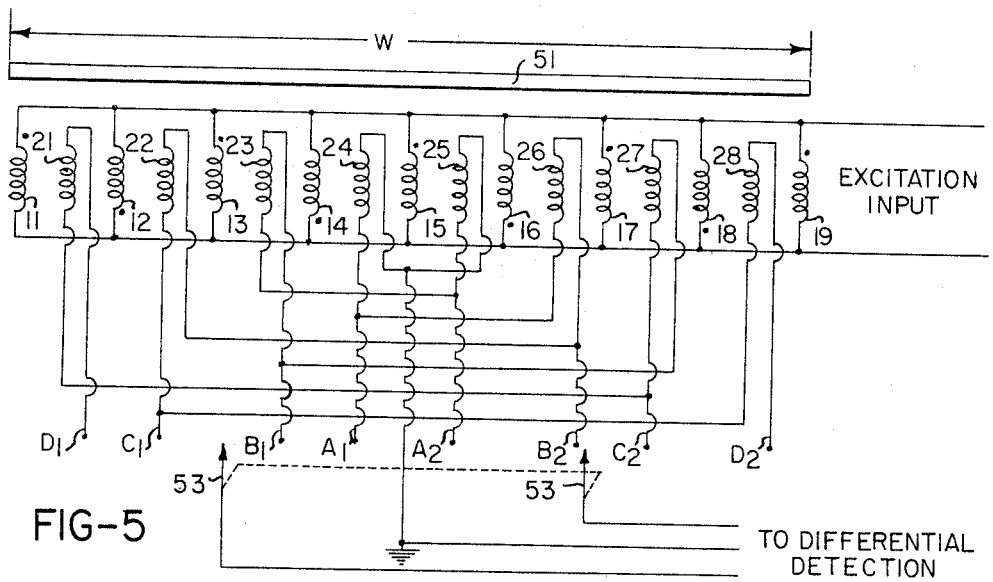
FIG. 5 shows a modification which is useful inspection of wide sheets.

As explained in the opposite-side-of-sheet applications Serial Nos. 94,472 and 159,497, now Patent 3,156,862, above referred to, the output of two sensing coils can be compared with the coils spaced in the direction of travel of sample as in FIG. 4 or with such coils spaced across the width of the sheet as in the present case, FIG. 5. However, as previously stated, the through the sheet pickup of those applications often takes inordinate amounts of power, and sometimes it is impossible to get any useful pickup in response to visually observable flaws where excitation is on one side and sensing is at the opposite side of the sheet. The present FIG. 5 arrangement is useful for the inspection of wide sheets and can be used to find terminations of lengthwise flaws and to detect the presence of bubbles which may have been rolled out to an extended length along a sheet and so would not be found by the arrangement of FIG. 4. Further, it should be noted that an arrangement as in FIG. 4 can only examine a narrow sample, or narrow sample portion, but it can pick up totally crosswise flaws such as, almost exclusively, welds which an arrangement as in FIG. 5 may miss. Many of the difficulties can be obviated by combining FIG. 4 and FIG. 5 arrangements (see FIG. 1 of my co-pending patent application Serial No. 94,472, filed March 9, 1961), or by mechanical scanning (see FIG. 7 of my above mentioned patent application), or by using an integrated (time averaged) demodulated (carrier suppressing) A.C. coupled readout so that readout (preferably through a meter relay) is responsive to changes rather than to any steady state conditions.

In FIG. 5 the excitation coils 11–19 are electrically energized in parallel while oppositely phased according to their successive adjacency. The sensing coils 21–28 are respectively located more or less in the null planes thus established across the width of sample 51. Electrically, sensing coils remote from one another are subtractively phase by relatively permanent connections and a pair of selector switch taps 53 are provided. Considering the case with the switch taps on contacts $D_1$ and $D_2$, coils 21, 27, 23, and 25 are in a series connection, with 21 and 23 connected in one residual phase direction and 27 and 25 connected in opposite residual phase direction. Coils 28, 22, 26, 24 are likewise in circuit but taken to provide the other channel for the difference detector. With this arrangement it has been found that null establishment is improved even more than would be the case using just two coils (e.g., 24 and 25) to feed the difference detector, but even the $A_1$, $A_2$ tap contacts can desirably be retained to permit inspection of very narrow sheets without differential amplifiers being overloaded because of shift of null planes by absence of sample. The solution disclosed by FIG. 5, then, is to disconnect irrelevant pickup coils. Further improvement may be made by also shutting off some of the exciter coils but, in order to keep the drawing simple, this is not illustrated.

Figure 6:
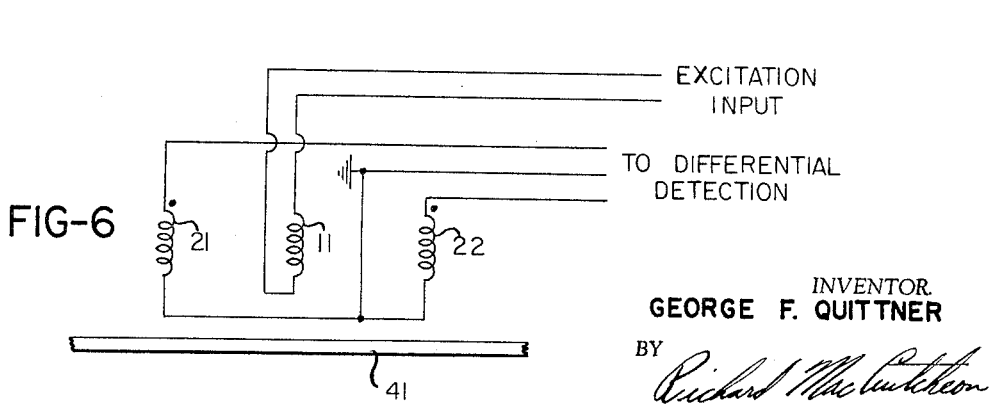
FIG. 6 shows a modification in which an excitation coil is located along a null plane between sensing coils.

A scheme useful under certain circumstances is shown in FIG. 6. Here a single excitation coil 11 is located with its axis in a "null plane" between two sensing coils 21, 22, which is the inverse of the arrangements of FIGS. 1, 2, 4 and 5. Although the FIG. 6 arrangement has certain limitations, sensitivity to relative tilt between pickup and sheet being one of them, it is particularly suited to one side of sheet flaw finding for relatively narrow sheets whose "pass line" (constancy of lateral position with respect to pickup) is very accurate so that close spacing can be used.

Figure 7:
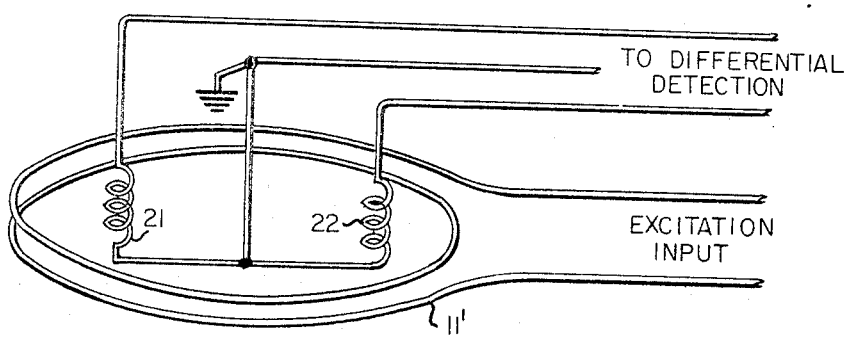
FIG. 7 shows a modification.

An arrangement which is magnetically equivalent to FIG. 6 is shown in FIG. 7 where sensing coils are surrounded by a single exciter coil 11'. The FIG. 7 arrangement is particularly useful for widthwise comparisons across narrow sheets because the sensing coils are inside the exciter coil.

Figure 8:
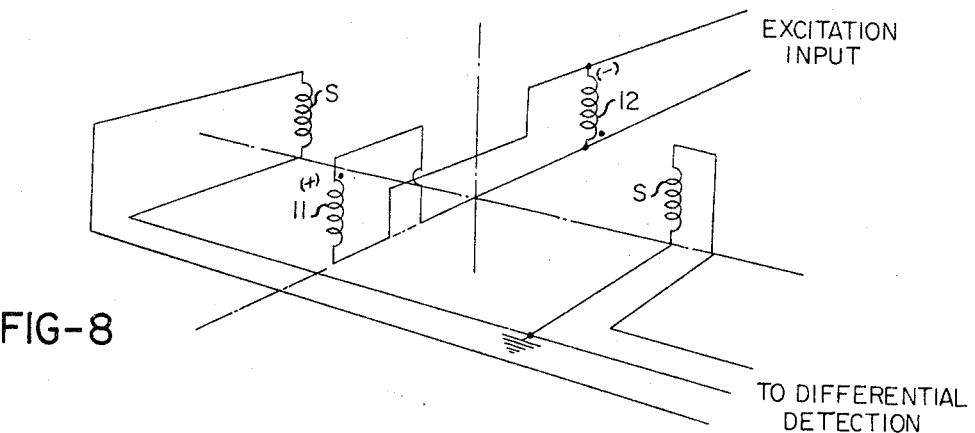
FIG. 8 shows an arrangement where two sensing coils are located in opposite symmetry with respect to a null plane established by two exciter coils.

In FIG. 8 two exciter coils 11, 12 are oppositely polarized one called "+" and the other at the same end "−," establishing a null plane in or along which two sensing coils S are mounted. This makes equal the number of sensing coils with respect to exciter coils.

Figure 9:
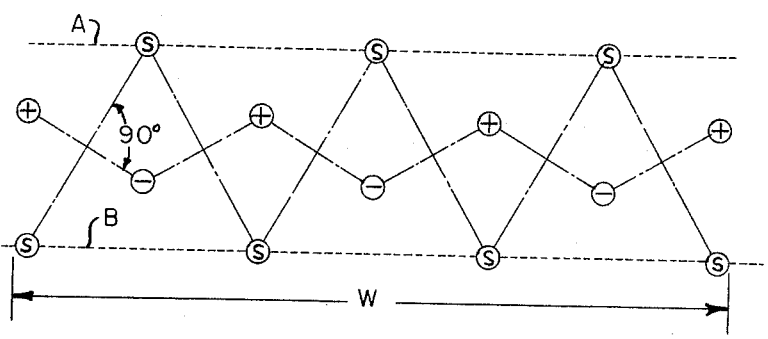
FIG. 9 shows a modification.

An expansion of the FIG. 8 arrangement is shown in FIG. 9 where S coils have their axes in null planes established by the coils marked "+" and "−." In actuality the geometrical nicety of FIG. 9 is not necessarily the exact location where in practice real null planes will fall. The end sensing coils should not necessarily fall in line with their mates shown (for simplicity) in line across the width "W," because of the effect of field distortions adjacent the ends of the sheet width. However, even with the depicted arrangement a weld extending all across the sheet would signal. For inspection of wide sheets I have found it often advantageous to have the angle (of an axis through S—S with respect to an axis through + and −) something other than 90°, in which case the sensing coils are located with opposite dimensional symmetry with respect to the null plane so that their combined effect is in one respect as though there were only one coil having its axis coinciding with the null plane established by the two exciter coils.

It has been found preferable to connect exciter coils (such as those shown in FIG. 9) in parallel and sensing coils (such as those shown in FIG. 9) in series by groups as more fully disclosed and claimed in my co-pending application Serial No. 218,781, filed August 22, 1962.

There is thus provided arrangements of the class described capable of meeting the objects above set forth, providing larger signals than prior art arrangements and the easy accomplishment of flaw detection and/or flaw responsive actuation of various equipments.

While I have illustrated and described particular embodiments, numerous modifications may obviously be made without departing from the true spirit and scope of the present invention which I intend to have defined only by the appended claims taken with all reasonable equivalents.

I claim:
1. In apparatus for detecting a flaw in a sample material having thickness as its minor dimension and which is ferromagnetic or electrically conductive, the combination of an alternating current source of power, plural flux producing exciter coils equal in number to three plus a multiple of two, all of said exciter coils being arranged with their axes substantially perpendicular to said sample material while spaced across the width of said sample material and all being on one side of said sample material as regards the direction of its thickness dimension, said exciter coils being connected to said source so that said exciter coils are oppositely phased as regards their successive adjacency whereby to establish null flux planes between successive coils, plural sensing coils equal in number to a multiple of two, all of said sensing coils being positioned to have their axes respectively substantially coincident with the respective null planes between sensing coils, while the sensing coils are located on the same side of said sample material in the direction of its thickness dimension as are said exciter coils, means including a double-make, double-break multi-position selector switch and circuitry separately through separate portions of said switch and through a diminishing number of sensing coils arranged as equal halves of sensing coils in circuit and for comparing, by differencing, the signal of one of plural sensing coil circuits with that of another and analogous sensing coil circuit by switch selection of pairs of different, but equal as between pairs, numbers of sensing coils in circuit, each such circuit, except when the number of sensing coils included therein is unity, being characterized by having sensing coils thereof subtractively connected in series, for further differencing.

2. In apparatus for detecting a flaw in a sample material having thickness as its minor dimension and which is ferromagnetic or electrically conductive, the combination of an alternating current source of power, a plurality of at least one pair of flux producing exciter coils arranged with their axes substantially perpendicular to said sample material, said exciter coils being arranged as at least one pair of coils spaced apart linearly in a first direction along said sample material and located all on one side of said sample material as regards the direction of its thickness dimension, said exciter coils being connected to said source so that said exciter coils are oppositely phased as regards their successive adjacency whereby to establish null flux plane means between successive coils, a plurality of at least one pair of sensing coils positioned to have their axes substantially coincident with said null flux plane means, with said sensing coils located on the same side of said material as regards the direction of its thickness dimension as are said exciter coils, said sensing coils being arranged as at least one pair of coils spaced apart linearly in a second direction which second direction is at substantially right angles to said first direction in which the exciter coils are spaced apart.

References Cited by the Examiner

UNITED STATES PATENTS

| Re. 20,343 | 4/1937 | Roede | 324—37 |
| 2,116,119 | 5/1938 | Loewenstein | 324—34 |
| 2,602,840 | 7/1952 | McKee | 324—37 |
| 2,679,622 | 5/1954 | Deri | 318—31 |
| 2,835,858 | 5/1958 | Moseley | 318—31 |
| 3,156,862 | 11/1964 | Herrick | 324—34 |

WALTER L. CARLSON, *Primary Examiner.*

R. V. ROLINEC, RICHARD B. WILKINSON, *Examiners.*

F. A. SEEMAR, *Assistant Examiner.*